(12) United States Patent
Furuya et al.

(10) Patent No.: US 7,926,795 B2
(45) Date of Patent: Apr. 19, 2011

(54) FRONT FORK

(75) Inventors: Ken Furuya, Tokyo (JP); Kiyoshi Kubo, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 633 days.

(21) Appl. No.: 12/071,655

(22) Filed: Feb. 25, 2008

(65) Prior Publication Data
US 2008/0230335 A1 Sep. 25, 2008

(30) Foreign Application Priority Data
Mar. 22, 2007 (JP) ................................ 2007-074077

(51) Int. Cl.
*F16F 5/00* (2006.01)
(52) U.S. Cl. ...................... 267/64.26; 188/312; 188/315
(58) Field of Classification Search .......... 188/312–315, 188/322.15, 322.17, 276, 297, 280, 288; 267/221, 64.26
See application file for complete search history.

(56) References Cited

U.S. PATENT DOCUMENTS
| | | | | |
|---|---|---|---|---|
| 6,120,049 A * | 9/2000 | Gonzalez et al. | ........ | 188/322.15 |
| 6,568,664 B2 * | 5/2003 | Furuya | ........................ | 267/64.26 |
| 7,575,110 B2 * | 8/2009 | Yoshimoto | .................... | 188/312 |

FOREIGN PATENT DOCUMENTS
JP 2005-030534 2/2005
* cited by examiner

*Primary Examiner* — Melanie Torres Williams
(74) *Attorney, Agent, or Firm* — Rabin & Berdo, PC

(57) ABSTRACT

A front fork comprises a telescopic tube (1, 32) in which a damper cylinder (3) generates a damping force. The damper cylinder (3) comprises a guide sleeve (4) and a free piston (6) having an inner circumference which slides on the outer circumference of the guide sleeve (4) and an outer circumference which slides on the inner circumference of the damper cylinder (3). A lateral through-hole (11) formed in the guide sleeve (4) connects an auxiliary reservoir (R3) formed outside the damper cylinder (3) and an oil reservoir (R2) via a flow path (12) formed in the guide sleeve (4) according to the displacement position of the free piston (6), thereby reducing the number of seal members required to be fitted on the outer circumference of the free piston (6) and enabling the free piston (6) to slide smoothly even when the telescopic tube (1, 32) suffers a bending force.

12 Claims, 3 Drawing Sheets

FRONT FORK

FIELD OF THE INVENTION

This invention relates to a front fork having a built-in damper for supporting a front wheel axis of a motorcycle on a vehicle body thereof.

BACKGROUND OF THE INVENTION

JP2005-30534A, published by the Japan Patent Office in 2005, proposes an inverted tube-type front fork adapted to be interposed between a vehicle body and a front wheel axis of a motorcycle. The front fork comprises a damper for absorbing oscillation input into the front wheel from running surface.

In this front fork, an inner tube connected to the wheel axis is inserted into an outer tube connected to the vehicle body so as to be free to slide. The damper is disposed in the interior of these tubes. The damper comprises a damper cylinder projecting downward from an upper end of the outer tube, a piston rod projecting upward from a bottom of the inner tube and having a tip inserted into the damper cylinder, and a piston fixed to a tip end of the piston rod in the damper cylinder.

The piston is in contact with an inner circumference of the damper cylinder so as to be free to slide in the axial direction and delimits an upper oil chamber above the piston and a lower oil chamber below the piston in the damper cylinder. As the piston slides axially in the damper cylinder, the capacity of these two oil chambers varies. The piston comprises a damping valve and a check valve which cause working oil in the oil chambers to flow therethrough depending on variation in the capacity of the two oil chambers.

The total capacity of the two oil chambers varies depending on a penetration volume of the piston rod into the damper cylinder. In order to compensate for oil amount variation in the damper cylinder due to this capacity variation, an oil reservoir is provided above the upper oil chamber in the damper cylinder. The oil reservoir is separated from the upper oil chamber by a base valve and an upper end of the oil reservoir is delimited by a free piston which is fitted into the inner circumference of the camper cylinder so as to be free to slide. The free piston is biased in a direction to compress the oil reservoir using compressed air in an air chamber formed above the free piston and a spring enclosed in the air chamber.

Further, a space having a ring-shaped cross section between the damper cylinder and the outer/inner tubes is utilized as an auxiliary reservoir in which air and working oil are enclosed.

SUMMARY OF THE INVENTION

When the oil pressure in the lower oil chamber damper decreases in the course of elongation/contraction of the damper, a minute amount of working oil may infiltrate the lower oil chamber from the auxiliary reservoir through a sliding part between the piston rod and the bottom of the damper cylinder. As elongation/contraction of the damper is repeatedly performed, the amount of working oil in the damper cylinder may increase, and accordingly the storage amount of working oil in the oil reservoir increases. When the piston strokes greatly in the direction of contraction, the free piston is also greatly lifted in the damper cylinder. When the amount of working oil in the oil reservoir increases, the lift amount of the free piston also increases.

A lateral through-hole is formed through the wall of the damper cylinder. The lateral through-hole has openings onto the interior and the exterior of the damper cylinder and connects the oil reservoir and the auxiliary reservoir when the free piston is lifted beyond a predetermined distance. When the piston strokes greatly in the direction of contraction, therefore, a part of the working oil in the oil reservoir flows out into the auxiliary reservoir through the lateral through-hole. The lateral through-hole thus has a function to maintain the working oil amount in the damper cylinder within a constant range.

A seal member is fitted onto the upper end and the lower end of the sliding part of the free piston which slides on the inner circumference of the damper cylinder so as to prevent air in the air chamber or working oil in the oil reservoir from infiltrating the lateral through-hole as long as the free piston stays within a normal lift range. The seal member fitted onto the upper end of the sliding part prevents air in the air chamber from infiltrating the lateral through-hole. The seal member fitted onto the lower end of the sliding part prevents working oil in the oil reservoir from infiltrating the lateral through-hole. The distance between the two seal members is determined to cover the normal lift range of the free piston.

The normal lift range of the free piston is determined to satisfy the following condition with respect to a maximum contraction stroke position of the piston. Specifically, when the working oil amount in the oil reservoir is within the constant range, then the free piston should not be lifted beyond the normal lift range when the piston reaches the maximum contraction stroke position. In contrast, when the working oil amount in the oil reservoir has exceeded the constant range, the free piston is lifted beyond the normal lift range to allow a part of working oil in the reservoir to flow out into the auxiliary reservoir via the lateral through-hole before the piston reaches the maximum contraction stroke. To summarize the above, the lift range corresponds directly to the oil amount stored in the oil reservoir, and hence the normal lift range of the free piston is determined in relation to the constant range of the working oil in the oil reservoir.

The front fork according to the prior art thus requires two seal members, one for air and the other for working oil. The seal members are fitted onto the outer circumference of the free piston. The distance between the two seal members is preset to cover the normal lift range of the free piston.

When the front fork suffers a bending force due to a shock input while the motorcycle is running, the bending force also acts on the damper cylinder. As a result, a deviation occurs in a contact pressure with respect to the inner circumferential surface of the damper cylinder in one or both of the seal members fitted onto the upper end and lower end of the free piston. This deviation in the contact pressure may inhibits the free piston from sliding in the damper cylinder. The deviation in the contact pressure increases as the distance between the two seal members increases. In the front fork according to the prior art, it is therefore difficult to ensure smooth sliding of the free piston when the damper cylinder suffers a bending force.

It is therefore an object of this invention to ensure smooth sliding of the free piston even when the front fork suffers a bending force.

In order to achieve the above object, this invention provides a front fork interposed between a front wheel axis and a vehicle body of a motorcycle, comprising a damper, a guide sleeve, a free piston, an oil reservoir, an auxiliary reservoir, a flow path formed through the guide sleeve and connected to the auxiliary reservoir, and a lateral through-hole formed through a wall of the guide sleeve and connected to the flow path, The damper generates a damping force according to elongation and contraction thereof and has a damper cylinder. The guide sleeve is fixed coaxially in the damper cylinder.

The free piston is fitted between the guide sleeve and the damper cylinder. The free piston has an inner circumference sliding on the outer circumference of the guide sleeve and an outer circumference sliding on the inner circumference of the damper cylinder. The oil reservoir is delimited by the free piston in the damper cylinder for storing working oil.

The free piston is arranged to slide in the damper cylinder in a direction to expand the oil reservoir when the damper contracts. The auxiliary reservoir is provided on the outside of the damper cylinder.

The lateral through-hole is arranged to be opened onto the reservoir when the free piston slides beyond a predetermined distance in the direction to enlarge the reservoir.

The details as well as other features and advantages of this invention are set forth in the remainder of the specification and are shown in the accompanying drawings.

DESCRIPTION OF THE PREFERRED EMBODIMENTS

Figure 1A:
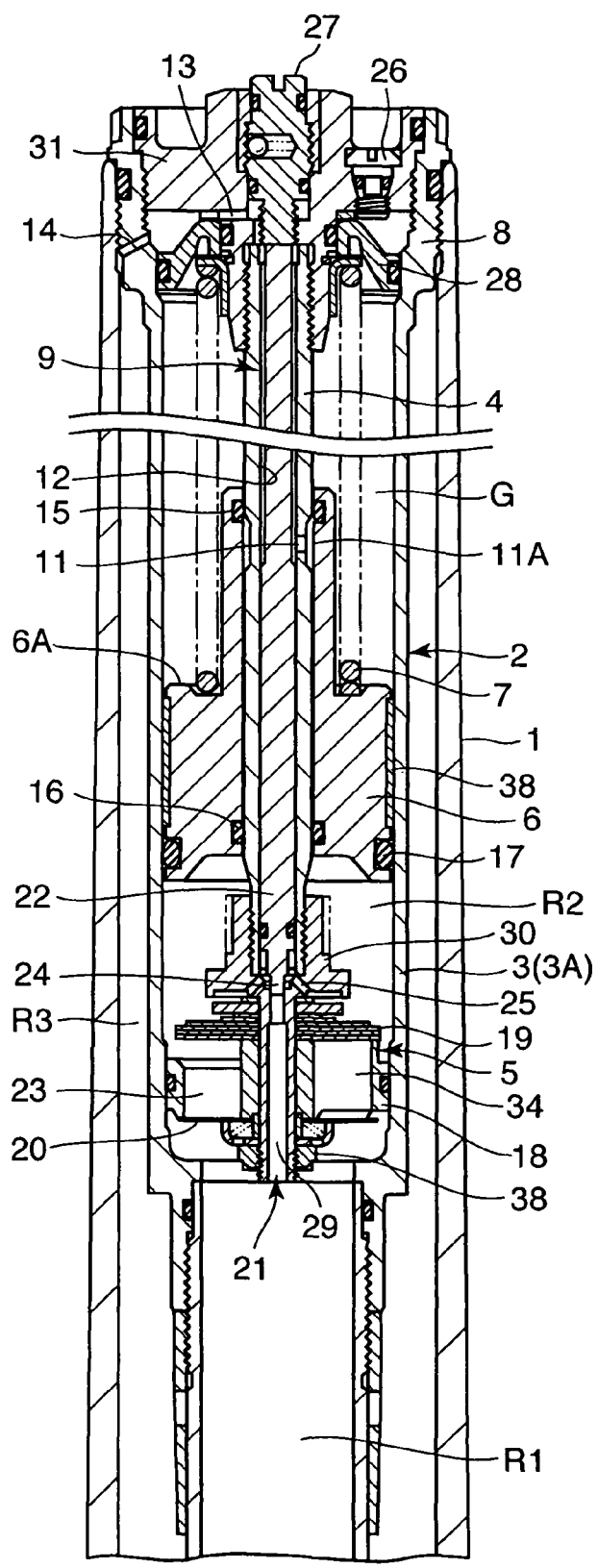
FIGS. 1A and 1B are a longitudinal sectional view of a front fork according to this invention.
Figure 1B:
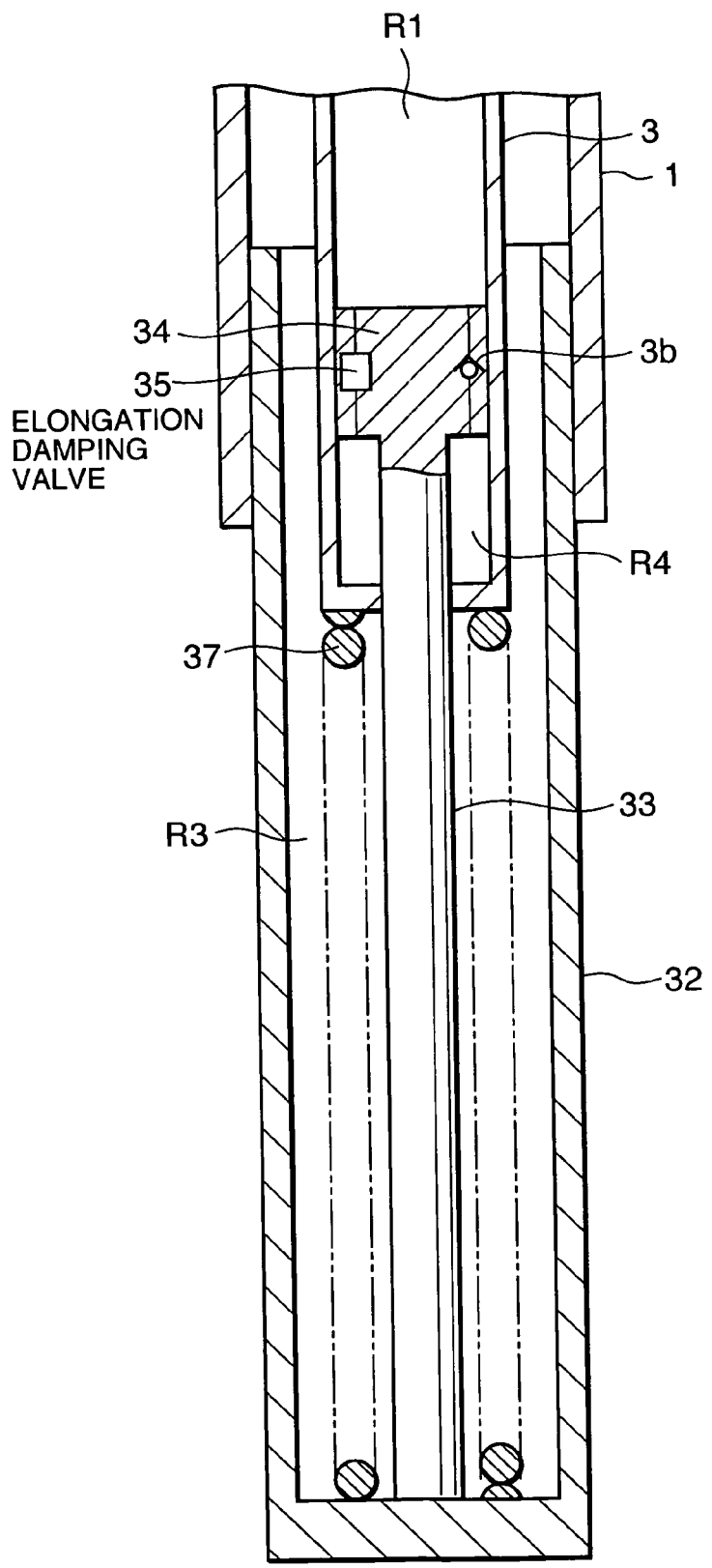

Referring to FIGS. 1A and 1B of the drawings, a front fork comprises a telescopic tube constituted by an outer tube 1 connected to a vehicle body of a motorcycle and an inner tube 32 connected to a front wheel axis of the same. The inner tube 32 is inserted into the outer tube 1 from beneath so as to be free to slide. A damper 2 is provided in the telescopic tube, or in other words in a space surrounded by the outer tube 1 and the inner tube 32.

The damper 2 comprises a damper cylinder 3 having a screw part 8 which is screwed into an inner circumference of an upper end of the outer tube 1, a piston rod 33 projecting upward from a bottom of the inner tube 32 and having a tip inserted into the damper cylinder 3, and a piston 34 fixed to a tip end of the piston rod in the damper cylinder 33.

An upper oil chamber R1 and a lower oil chamber R4 filled with working oil, respectively, are delimited in the damper cylinder 3 by the piston 34. The piston 34 comprises an elongation damping valve 35 and a check valve 36. The elongation damping valve 35 allows working oil in the lower oil chamber R4 to flow into the upper oil chamber R1 under a drag of which the magnitude depends on a flow velocity. The check valve 36 allows working oil in the upper oil chamber R1 to flow into the lower oil chamber R4 while preventing working oil from flowing in the opposite direction.

A coil spring 37 is interposed between the damper cylinder 3 and the base of the inner tube 32 so as to bias the damper 2 in an elongation direction.

The damper cylinder 3 has an enlarged diameter part 3A located above the upper oil chamber R1 and connected to the screw part 8. A base valve 5 and a free piston 6 are disposed in the enlarged diameter part 3A. An oil reservoir R2 is delimited above the upper oil chamber R1 by the base valve 5 and an air chamber G is delimited above the oil reservoir R2 by the free piston 6 in the enlarged diameter part 3A.

An auxiliary reservoir R3 in which working oil and air are enclosed is provided in a space having a ring-shaped cross section on the outside of the damper 2 in the outer tube 1 and the inner tube 32.

The base valve 5 is fixed to a tip end of a guide sleeve 4 projecting downward from a plug 31 which is screwed into the screw part 8. The base valve 5 comprises a disk-shaped valve body 18, an outer circumference of which is in close contact with the inner circumference of the enlarged diameter part 3A, a check valve 20, and a contraction damping valve 19. An elongation flow port 24 and a contraction flow port 34 are formed respectively through the valve body 18. The check valve 20 is disposed at an exit of the elongation flow port 24 and the contraction damping valve 19 which is constituted by a leaf valve is disposed at an exit of the contraction flow port 34. The valve body 18, the contraction damping valve 19, and the check valve 20 are gripped together between a retainer 30 screwed onto the outer circumference of the guide sleeve 4 in the reservoir R2 and a nut 38 secured onto the tip end of the retainer 30 in the upper oil chamber R1, and are held fixedly on the tip of the guide sleeve 4.

The guide sleeve 4 has a hollow space extending in an axial direction, and a control rod 22 is inserted into this hollow space. A bypass passage 21 which bypasses the base valve 5 and connects the upper oil chamber R1 and the oil reservoir R2 directly is formed through this hollow space.

The bypass passage 21 is connected to the upper oil chamber R1 via a vertical hole 29 which is formed through the retainer 30. A needle valve 24 is formed on the tip end of the control rod 22 facing the vertical hole 29. A through-hole 25 penetrating a wall of the retainer 30 connects the interior of the retainer 30 and the oil reservoir R2 via the needle valve 24.

An upper end of the control rod 22 is in contact with an adjuster 27 which is screwed into a center hole of the plug 31. The adjuster 27 has an operation groove exposed to the outside of the outer tube 1 in the axial direction. The control rod 22 displaces axially by rotating the adjuster 27 via the operation groove and an opening degree of the needle valve 24 is thereby adjusted.

The free piston 6 is fitted onto the outer circumference of the guide sleeve 4 so as to be free to slide. The free piston 6 is in sliding contact with the inner circumference of the enlarged diameter part 3A via a bushing 38 fixed onto the outer circumference of the free piston 6 and a ring-shaped seal member 17 fitted onto the outer circumference of the free piston 6 below the bushing 38. A ring-shaped seal member 15 is fitted onto the inner circumference of an upper end of the free piston 6 so as to slide on the outer circumference of the guide sleeve 4. A ring-shaped seal member 16 is fitted onto the inner circumference of a lower end of the free piston 6 so as to slide on the outer circumference of the guide sleeve 4.

The free piston 6 is resiliently supported downward by a coil spring 7 disposed in the air chamber G and air pressure in the air chamber G. An end of the coil spring 7 is in contact with a step 6A of the free piston 6 from above. The step 6A is formed between an inner sliding part which slides on the guide sleeve 4 and an outer sliding part which slides on the enlarged diameter part 3A. The other end of the coil spring 7 is in contact with a partitioning member 28, an upper end of which is supported by the plug 31 and an outer circumference of which is supported by the screwed part 8.

The front fork comprises a passage 9 which allows working oil in the oil reservoir R2 defined between the base valve 5 and free piston 6 to flow into the auxiliary reservoir R3 depending on a stroke position of the free piston 6.

The passage 9 comprises a lateral through-hole 11 which connects the interior and the exterior of the guide sleeve 4, a ring-shaped flow path 12 formed between the control rod 22 and the guide sleeve 4, a flow path 13 formed through the plug 31 and the partitioning member 28, and a flow path 14 formed through the screw part 8 of the damper cylinder 3. Preferably, a recess 11A is formed on the outer circumference of the guide sleeve 4 around the opening of the lateral through-hole 11 facing the free piston 6.

The aforesaid seal member 16 has a function to seal the recess. 11A and the lateral through-hole 11 from working oil in the oil reservoir R2 and the aforesaid seal member 15 has a function to seal the recess 11A and the lateral through-hole 11 from air in the air chamber G. The inner circumference of the free piston 7 onto which the seal members 15 and 16 are fitted is therefore set to have a length that covers a normal lift range of the free piston 6.

Although not shown explicitly in the figure, the flow path 13 formed through the plug 31 and the partitioning member 28 and the upper part of the flow path 12 are connected via a passage penetrating the plug 31 vertically. It should be noted that various design variations are possible with respect to the composition of the passage 9 between the flow paths 12 and 14.

The front fork further comprises an oil supply valve 26 and an air supply valve which are provided in the plug 31. The front fork is brought into an in-service state where a predetermined amount of working oil and air of a predetermined pressure are enclosed in advance.

In the in-service state of the front fork, the free piston 6 is biased downward by the coil spring 7 and the air pressure in the air chamber G such that the interior of the damper 2 is maintained in a pressurized state, and hence when an contraction load is exerted on the front fork, the damper can generate a damping force from the very beginning of the contraction.

In a contraction stroke of the front fork, the piston 34 moves upward in the damper cylinder 3 such that the upper oil chamber R1 shrinks and the lower oil chamber R4 expands. Working oil in the shrinking upper oil chamber R1 flows into the expanding oil chamber R4 through the check valve 36 in the piston 34. Further, the base valve 5 causes working oil corresponding to an increase in the penetration volume of the piston rod 33 into the damper cylinder 3 to flow into the reservoir R2 through the contraction flow port 34 of the base valve 5 via the contraction damping valve 19. The contraction damping valve 19 generates a contraction damping force by imposing a drag on the flow of the working oil passing therethrough depending on the flow velocity.

In an elongation stroke of the front fork, the piston 34 moves downward in the damper cylinder 3 such that the oil chamber R1 expands and the oil chamber R4 shrinks. Working oil in the shrinking lower oil chamber R4 flows into the expanding oil chamber R1 via the elongation damping valve 35 installed in the piston 34. The elongation damping valve 35 generates an elongation damping force by imposing a drag on the the flow of the working oil passing therethrough depending on the flow velocity. The base valve 5 causes working oil corresponding to a decrease in the penetration volume of the piston rod 33 in the damper cylinder 3 to flow into the upper oil chamber R2 via the check valve 20.

When the front fork contracts, the free piston 6 is pushed upward by the working oil that has flowed into the reservoir R2 against the resilience of the spring 7 and the air pressure in the air chamber G. As the damper 2 performs contraction and elongation, a minute amount of working oil in the auxiliary reservoir R3 infiltrates the damper cylinder 3 via a sliding portion between the piston rod 33 and the bottom of the damper cylinder 3. As a result, the volume of working oil in the oil reservoir R2 increases.

Figure 2:
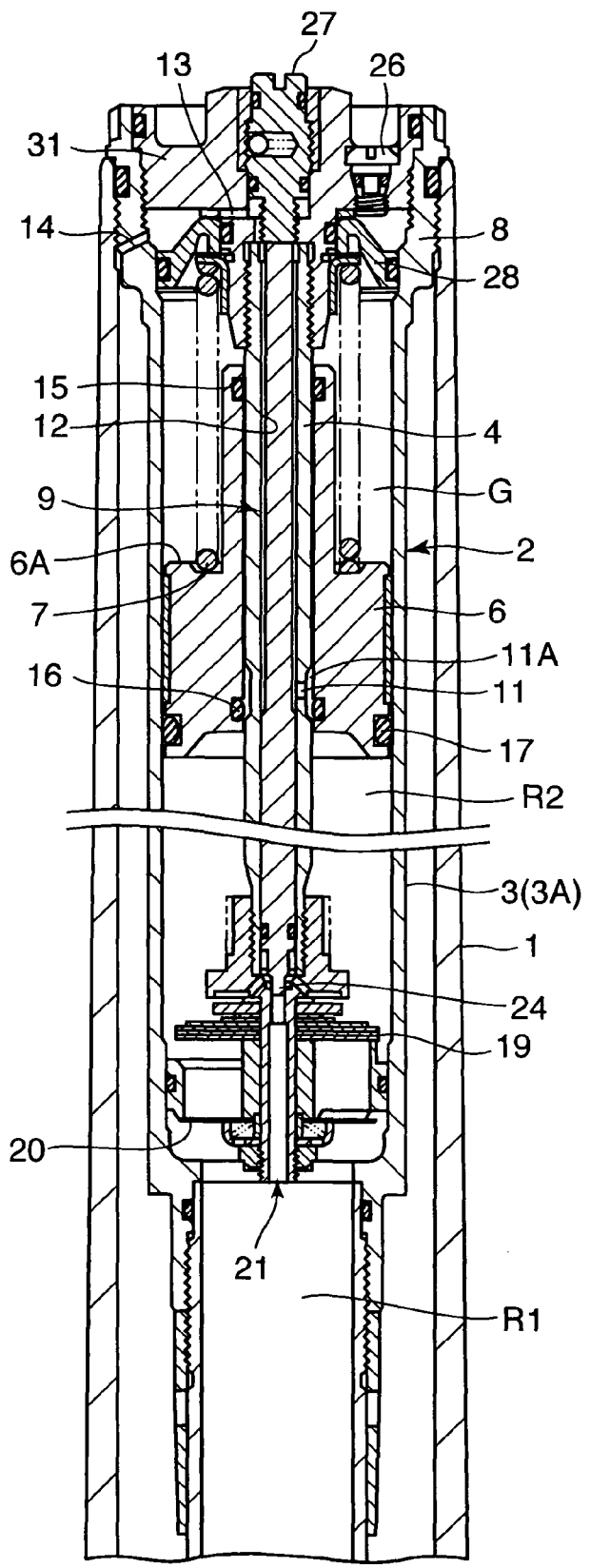
FIG. 2 is a longitudinal sectional view of essential parts of the front fork showing a state where a free piston has been pushed upward.

In this state, when the piston 34 strokes near to a maximum contraction stroke position, the free piston 6 is lifted beyond the normal lift range. As a result, the seal member 16 fitted onto the inner circumference of the lower end of the free piston 6 passes the recess 11A formed on the outer circumference of the guide sleeve 4, and the reservoir R2 communicates with the passage 9 via the recess 11A, as shown in FIG. 2.

When the reservoir R2 communicates with the passage 9, a part of the working oil in the reservoir R2 flows out into the auxiliary reservoir R3 via the passage 9. The passage 9 thus functions to compensate for an increase in the working oil amount in the oil reservoir R2 due to the infiltration of working oil into the damper cylinder 3 and maintain the amount of working oil in the damper cylinder 3 within a constant range.

As described above, in this front fork, the passage 9 which allows a part of the working oil in the reservoir R2 to flow out into the auxiliary reservoir R3 is provided between the guide sleeve 4 and the inner circumference of the free piston 6. Accordingly, only the single seal member 17 which separates working oil and air is required on the outer circumference of the free piston 6. The outer circumference of the free piston 6 provided with only the single seal member 17 is not likely to interfere with the sliding action of the free piston 6. Further, since the seal member 17 absorbs a deflection of the damper cylinder 3, the seal members 15 and 16 on the inner circumference of the free piston 6 are unlikely to cause circumferential deviation in the contact pressure. As a result, this invention can realize a front fork in which smooth sliding of the free piston is seldom inhibited.

The contents of Tokugan 2007-074077, with a filing date of Mar. 22, 2007 in Japan, are hereby incorporated by reference.

Although the invention has been described above with reference to certain embodiments of the invention, the invention is not limited to the embodiments described above. Modifications and variations of the embodiments described above will occur to those skilled in the art, within the scope of the claims.

What is claimed is:

1. A front fork interposed between a front wheel axis and a vehicle body of a motorcycle, comprising:
    a damper which generates a damping force according to elongation and contraction thereof, the damper having a damper cylinder;
    a guide sleeve fixed coaxially in the damper cylinder;
    a free piston fitted between the guide sleeve and the damper cylinder, the free piston having an inner circumference sliding on the outer circumference of the guide sleeve and an outer circumference that slides on the inner circumference of the damper cylinder;
    an oil reservoir delimited by the free piston in the damper cylinder for storing working oil, the free piston being arranged to slide in the damper cylinder in a direction to expand the reservoir when the damper contracts;
    an auxiliary reservoir provided on the outside of the damper cylinder;
    a flow path formed through the guide sleeve and connected to the auxiliary reservoir; and
    a lateral through-hole penetrating a wall of the guide sleeve and connected to the flow path, the lateral through-hole being arranged to be opened onto the reservoir when the free piston slides beyond a predetermined distance in the direction to enlarge the reservoir.

2. The front fork as defined in claim 1, wherein the free piston comprises a seal member which seals the lateral through-hole from air above the free piston and a seal member which seals the lateral through-hole from the oil reservoir.

3. The front fork as defined in claim 1, wherein the free piston comprises a single seal member fitted onto the outer circumference which slides slide on the inner circumference of the damper cylinder.

4. The front fork as defined in claim 1, wherein an axial length of the inner circumference of the free piston is greater than an axial length of the outer circumference of the free piston.

5. The front fork as defined in claim 1, wherein the damper cylinder comprises an air chamber which is delimited from the oil reservoir by the free piston.

6. The front fork as defined in claim 5, wherein the air chamber and a space above an oil surface in the auxiliary reservoir are filled with air.

7. The front fork as defined in claim 1, wherein the flow path is connected to the auxiliary reservoir via a flow path formed in a base of the damper cylinder.

8. The front fork as defined in claim 1, wherein the lateral through-hole has an opening in a recess formed on the outer circumference of the guide sleeve.

9. The front fork as defined in claim 1, wherein the damper further comprises a piston rod having a tip end inserted into the damper cylinder 3, a piston fixed to the tip end of the piston rod and delimiting two oil chambers on both sides thereof in the damper cylinder, and a base valve which connects one of the oil chambers and the oil reservoir.

10. The front fork as defined in claim 9, further comprising a telescopic tube constituted by an outer tube connected to the vehicle body and an inner tube connected to the front wheel axis and inserted into the outer tube so as to be free to slide, the damper is enclosed in the telescopic tube in a state where a base of the damper cylinder is fixed to the outer tube and a base of the piston rod is fixed to the inner tube, and the auxiliary reservoir is provided in the telescopic tube on the outside of the damper cylinder.

11. The front fork as defined in claim 9, wherein the base valve comprises a damping valve which allows working oil to flow from one of the oil chambers to the oil reservoir while generating a damping force, and a check valve which allows working oil to flow from the oil reservoir to the one of the oil chambers while preventing working oil from flowing in the opposite direction.

12. The front fork as defined in claim 11, further comprising a bypass passage which connects the one of the oil chambers and the oil reservoir by bypassing the base valve, and a needle valve operable from outside the telescopic tube to adjust a flow cross-sectional area of the bypass passage.

* * * * *